United States Patent [19]

Bohen

[11] Patent Number: 4,927,873
[45] Date of Patent: May 22, 1990

[54] HALOPHENYL ESTER FLAME RETARDANTS FOR POLYPHENYLENE ETHER RESINS

[75] Inventor: Joseph M. Bohen, King of Prussia, Pa.

[73] Assignee: Pennwalt Corporation, Philadelphia, Pa.

[21] Appl. No.: 173,516

[22] Filed: Mar. 25, 1988

[51] Int. Cl.$^5$ .......................... C08K 5/10; C08K 5/11; C08K 5/12
[52] U.S. Cl. ...................... 524/288; 524/412
[58] Field of Search ................ 524/412, 288

[56] References Cited

U.S. PATENT DOCUMENTS

| | | |
|---|---|---|
| 3,207,731 | 9/1965 | Tousignant . |
| 3,210,326 | 10/1965 | Tousignant . |
| 3,257,357 | 6/1966 | Stamatoff . |
| 3,257,358 | 6/1966 | Stamatoff . |
| 3,271,333 | 9/1966 | Eichhorn ............................. 524/288 |
| 3,275,578 | 9/1966 | Pedjac et al. ....................... 521/123 |
| 3,275,596 | 9/1966 | Klug et al. ........................... 524/288 |
| 3,306,874 | 2/1967 | Hay . |
| 3,306,875 | 2/1967 | Hay . |
| 3,383,435 | 5/1968 | Cizek . |
| 3,639,506 | 2/1972 | Haaf . |
| 3,660,351 | 5/1975 | Schmidt et al. ..................... 524/288 |
| 3,733,307 | 5/1973 | Cooper . |
| 3,804,885 | 4/1974 | Reineke et al. ..................... 524/316 |
| 3,809,729 | 5/1974 | Reinhard . |
| 3,845,102 | 10/1974 | Higuchi et al. . |
| 3,867,336 | 2/1975 | Fox . |
| 3,919,356 | 11/1975 | Boyer . |
| 3,932,321 | 1/1976 | Maki et al. . |
| 3,936,506 | 2/1976 | Berthold . |
| 3,966,676 | 6/1976 | Richter et al. ...................... 524/288 |
| 3,974,235 | 8/1976 | Cooper et al. . |
| 3,989,531 | 11/1976 | Orlando et al. ..................... 524/288 |
| 4,024,093 | 5/1977 | Abolins et al. . |
| 4,032,509 | 6/1977 | Lee . |
| 4,034,136 | 7/1977 | Wright et al. . |
| 4,048,263 | 9/1977 | Lee . |
| 4,073,772 | 2/1978 | Anderson . |
| 4,094,856 | 6/1978 | Guschl . |
| 4,096,117 | 6/1978 | Anderson . |
| 4,098,704 | 7/1978 | Sandler . |
| 4,105,628 | 8/1978 | Petersen . |
| 4,107,232 | 8/1978 | Haaf et al. . |
| 4,108,943 | 8/1978 | Lee . |
| 4,110,296 | 8/1978 | Wang . |
| 4,191,685 | 3/1980 | Haaf et al. . |
| 4,203,931 | 5/1980 | Lee ..................................... 524/411 |
| 4,205,153 | 5/1980 | Weinstein . |
| 4,206,154 | 6/1980 | Lee, Jr. et al. . |
| 4,274,998 | 6/1981 | Yamashita et al. . |
| 4,280,951 | 7/1981 | Saito et al. . |
| 4,298,514 | 11/1981 | Lee . |
| 4,298,517 | 11/1981 | Sandler . |
| 4,301,062 | 11/1981 | Yamashita et al. . |
| 4,355,126 | 10/1982 | Haaf et al. . |
| 4,397,977 | 8/1983 | Sandler . |
| 4,403,057 | 9/1983 | Yamashita et al. ................ 524/288 |
| 4,415,704 | 11/1983 | Weinstein . |
| 4,446,272 | 5/1984 | Fukuda et al. . |
| 4,456,720 | 6/1984 | Abolins et al. . |
| 4,567,242 | 1/1986 | Nishiboro et al. ................. 524/288 |

FOREIGN PATENT DOCUMENTS

| | | |
|---|---|---|
| 73539 | 3/1983 | European Pat. Off. . |
| 2161526 | 6/1979 | Fed. Rep. of Germany . |
| 2554513 | 3/1981 | Fed. Rep. of Germany . |
| 47-46478 | 6/1972 | Japan . |
| 48-101443 | 12/1973 | Japan . |
| 50-95353 | 3/1975 | Japan . |
| 50-87146 | 7/1975 | Japan . |
| 50-90639 | 7/1975 | Japan . |
| 51-23545 | 3/1976 | Japan . |
| 51-86554 | 11/1976 | Japan . |
| 53-120755 | 10/1978 | Japan . |
| 55-56140 | 7/1980 | Japan . |

*Primary Examiner*—Veronica P. Hoke
*Attorney, Agent, or Firm*—Panitch Schwarze Jacobs & Nadel

[57] ABSTRACT

Flame retardancy of polyphenylene ether resins is increased by blending with the resin a flame retarding amount of a halophenyl hydrocarbyl ester. The ester is preferably the reaction production of a halogenated phenol, preferably a bromophenol, and a hydrocarbyl acid, acid chloride or acid anhydride. The polyphenylene ether resin may include homopolymers or copolymers of polyphenylene ethers or blends of polyphenylene ethers with vinyl aromatic resins such as styrene polymers and copolymers. The flame retarding halophenyl esters are also effective as processing aids in improving the flowability and moldability of the polyphenylene ether resins during melt processing.

14 Claims, No Drawings

HALOPHENYL ESTER FLAME RETARDANTS FOR POLYPHENYLENE ETHER RESINS

CROSS REFERENCE TO RELATED APPLICATIONS

This application is related to copending U.S. patent application Ser. No. 896,896, filed Aug. 15, 1986 by Ronald F. Lovenguth for "Tetrahalophthalate Esters as Flame Retardants for Polyphenylene Ether Resins", now U.S. Pat. No. 4764550, which in turn is a continuation-in-part of U.S. application Ser. No. 777,043, filed Sept. 17, 1985, now abandoned. This application is also related to International Application No. PCT/US86/01771, filed in the United States on Aug. 27, 1986 by the same inventor identified above. This application is also related to U.S. Serial No. 173,518 for "Halogenated Polyester Flame Retardants for Polyphenylene Ether Resins" and U.S. Ser. No. 173,487 for "Halogen Substituted Phthalimide Flame Retardants", both filed concurrently herewith. The disclosures of these related applications are incorporated herein by reference. The claimed invention of the present application and the subject matter of the above-identified applications were commonly owned or subject to an obligation of assignment to the same entity at the time the present invention was made.

FIELD OF THE INVENTION

The present invention relates to flame retardant compositions containing at least one halogen-substituted compound and a polyphenylene oxide/ether (PPO) resin. More particularly, the invention is directed to methods and compositions for improving the flame retardancy and processability of PPO resins using halogen-substituted compounds.

BACKGROUND OF THE INVENTION

Polyphenylene ether (also referred to as polyphenylene oxide or PPO) resins are known in the art as a class of thermoplastics which are characterized by excellent physical properties, including hydrolytic stability, dimensional stability and excellent dielectric properties. In general, they are prepared by the oxidative coupling of a phenolic compound with complex metal catalysts, e.g., a complex copper catalyst. The preparation of polyphenylene ether resins is described in Hay, U.S. Pat. Nos. 3,306,874 and 3,306,875 and U.S. Pat. Nos. 3,257,357 and 3,257,358 of Stamatoff, the teachings of which are incorporated herein by reference.

The high molecular weight polyphenylene ethers are high performance engineering thermoplastics possessing relatively high melt viscosities and softening points, that is, in excess of 250° C., and are useful for many commercial applications requiring high temperature resistance including formation of film, fiber and molded articles.

Cisek, U.S. Pat. No. 3,383,435, which is incorporated herein by reference, discloses polyphenylene ether-styrene resin compositions including rubber-modified styrene resin-polyphenylene ether resins wherein the rubber component is of the unsaturated type such as polymers and copolymers of butadiene. Although the styrene resin component improves the moldability of the polyphenylene ethers, these compositions are still difficult to process. Polyphenylene ether/styrene resin blends comprising between about 25 and 75% of polystyrene units are available commercially from the General Electric Company under the NORYL trademark.

The use of brominated and/or chlorinated compounds by themselves or in combination with other materials such as organic phosphates, boron compounds, etc., as flame retardants for polyphenylene ether resin compositions are well known in the art and are exemplified by U.S. Pat. Nos. 3,257,357; 3,639,506; 3,733,307; 3,809,729; 3,867,336; 3,919,356; 3,936,414; 3,974,235; 3,939,531; 4,024,093; 4,034,136; 4,073,772; 4,094,856; 4,096,117; 4,107,232; 4,191,685; 4,203,931, 4,206,154; 4,274,998; 4,280,951; 4,298,514; 4,301,062; 4,355,126; 4,403,057; 4,446,272; and 4,456,720. The aforesaid patents are incorporated herein by reference.

Further, tetrahalophthalate esters have been used as flame-proofing materials. For example, U.S. Pat. No. 4,098,704 describes the use of these materials as textile finishing agents. U.S. Pat. Nos. 4,298,517 and 4,397,977 disclose these compounds as flame retardants for halogenated resins. However, prior to the inventions of the above related applications of Lovenguth, it was unknown to use these compounds as flame retardants or processing aids for polyphenylene ether resins.

Polyhalophenyl esters have been used as flameproofing materials either as additives to plastics or incorporated as part of the polymer backbone. Examples of the latter are polyhalophenyl esters of polymerizable acids such as 2,4,6 tribromophenyl methacrylate, pentabromophenyl methacrylate, 2,4,6-tribromophenyl acrylate, pentachlorophenyl methacrylate, pentabromophenyl acrylate, trichlorophenyl acrylate, tetrabromoxylylene di(methacrylate), etc., which are exemplified by U.S Pat. Nos. 3,207,731; 3,210,326; 3,845,102; 3,932,321; 4,032,509; 4,048,263; 4,105,628; 4,108,943; 4,110,296; 4,205,153; and 4,415,704, the disclosures of which are incorporated herein by reference.

Examples of polyhalophenyl esters that have been used as additives to plastics are pentabromophenyl 2,4,4,4-tetrachlorobutyrate, bis(2,4,6-tribromophenyl) tetrachloroterephthalate, pentabromophenyl o-(2,4,6-tribromophenoxymethyl) benzoate, pentabromophenyl o-(pentachlorophenylthiomethyl) benzoate, bis(2,4,6-tribromophenyl) isophthalate, bis(pentabromophenyl) terephthalate, 2,4,6-tribromophenyl 3,5-dibromobenzoate, 2,4,6,-tribromophenyl tribromopivalate, pentachlorophenyl tribromopivalate, bis(2,4,6-trichlorophenyl) phthalate, bis(2,4,6-tribromophenyl) phthalate, pentachlorophenyl acetate, bis(2,4,6 tribromophenyl) sebacate, and pentabromophenyl acetate, etc., which are exemplified by U.S. Pat. Nos. 3,275,578; 3,660,351; and 3,804,885 as well as Eur. Pat. Appl. No. EP73539; Japan Kokai JP No. 55/56140; 53/120755; 51/86554; 51/23545; 50/90639; 50/95353; 50/87146; 48/101443 and 47/4647; and Ger. Offen. No. DE 2,554,513 and DE 2,161,526, the disclosures of which are incorporated herein by reference. However, no teachings have been found which show the use of these compounds as flame retardants or processing aids for polyphenylene ether resins or PPO resin blends.

BRIEF SUMMARY OF THE INVENTION

According to the present invention, flame retardant compositions are provided in which a polyphenylene ether resin or resin blend contains an amount of halophenyl hydrocarbyl ester effective to increase the flame retardancy of the resin. The halophenyl hydrocarbyl ester is preferably the reaction product of a halogenated phenol with a hydrocarbyl acid, acid chloride or acid anhydride. The ester preferably contains at least about 25 weight percent bound halogen, preferably bromine or chlorine, with at least about 35 weight percent bound bromine being particularly preferred.

The halophenyl ester may be present in the polyphenylene ether resin or resin blend in a weight ratio in the range of about 1:100 to about 1:2. The polyphenylene ether resin may be present as a homopolymer or copolymer of polyphenylene ether, or more preferably in the form of a blend of polyphenylene ether homopolymer or copolymer with a vinyl aromatic resin such as polystyrene or a styrene copolymer.

Also according to the present invention, the processability of polyphenylene ether resins or resin blends is improved by the addition of the same halophenyl esters which improve the flame retardancy of the resins.

DETAILED DESCRIPTION OF PREFERRED EMBODIMENTS

In general, the polyphenylene ether resins to which the present invention is directed are of the type described in the U.S. patents of Hay and Stamatoff, described above, as well as copolymers of these resins, such as the type described in U.S. Pat. No. 3,733,307. In addition, the invention is directed to blends of PPO homopolymer and/or copolymer resins with vinyl aromatic resins, such as those of the type described in Cisek U.S. Pat. No. 3,383,435, referred to above.

Preferred polyphenylene ether resins that may be used in the present invention include the following:

(1) Homopolymers having repeated structural units of the formula:

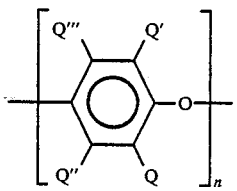

where Q, Q', Q", Q''' are independently hydrogen, hydrocarbon radicals, or halohydrocarbon radicals having at least two carbon atoms between the halogen atom and phenyl nucleus, or Q', Q", and Q''' may be halogen, with the proviso that Q and Q' are preferably free of tertiary carbon atoms; and n represents the total number of monomer units and is preferably an integer of at least 10. Examples of polyphenylene ethers corresponding to the above formula can be found in the above-referenced patents of Hay and Stamatoff.

(2) Copolymers with repeating structural units of the formula:

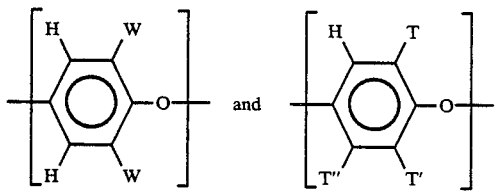

where W may be methyl, Cl, Br, or I; and T, T' and T" are independently alkyl of 1 to 3 carbons, aryl, alkaryl, haloaryl, or arylalkyl of from 6 to 12 carbons. Examples of these copolymers can be found in U.S. Pat. No. 3,733,307.

(3) Blends of (1) and/or (2) with vinyl aromatic resins wherein at least 10% by weight of the blend is derived from vinyl aromatic monomers of the formula:

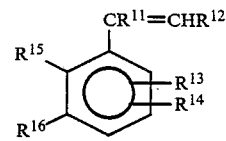

where $R^{11}$ and $R^{12}$ are independently lower alkyl or alkenyl groups of from 1 to 6 carbon atoms or hydrogen; $R^{13}$ and $R^{14}$ are independently chloro, bromo, hydrogen or lower alkyl of from 1 to 6 carbon atoms; $R^{15}$ and $R^{16}$ are independently hydrogen or lower alkyl or alkenyl groups of 1 to 6 carbons, or $R^{15}$ and $R^{16}$ may be concatenated together with hydrocarbyl groups to form a naphthyl group. Moieties that may be copolymerized with the units of the vinyl aromatic monomer include those having the general formula:

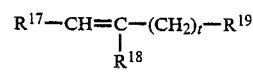

wherein $R^{17}$ and $R^{18}$ are independently hydrogen, halogen, alkyl of 1-4 carbon atoms, or carboalkoxy, or $R^{17}$ and $R^{18}$ taken together represent an anhydride linkage (-COOOC-) and $R^{19}$ is hydrogen, vinyl, alkyl or alkenyl having 1 to 12 carbon atoms, cycloalkyl, carboalkoxy, alkoxy-alkyl, alkylcarboxy, ketoxy, halogen, carboxy, cyano or pyridyl; and t is a whole number in the range of about 0 to 9.

The general formula set forth for vinyl aromatic monomer is intended to include by way of example, homopolymers such as polystyrene and monochloropolystyrene, the modified polystyrenes, such as rubber-modified, high-impact polystyrene and the styrene-containing copolymers, such as the styrene-acrylonitrile copolymers, styrene-butadiene copolymers, styrene-acrylonitirile-alkyl styrene copolymers, styrene-acrylonitrile-butadiene copolymers, polymethylstyrene, copolymers of ethylvinylbenzene and divinylbenzene, styrene-maleic anhydride copolymers, styrene-butadiene-styrene block copolymers, styrene-butadiene block copolymers, and styrene-butadiene-styrene maleic anhydride block copolymers. The preferred vinyl aromatic resins are the halogen-free vinyl aromatic resins.

The preferred polyphenylene ether resins are blends of (1) and (3) above. Especially preferred are those blends in which the vinyl aromatic resin is polystyrene or a copolymer of styrene and 1,3-butadiene.

The PPO resins and PPO resin blends are compounded with halophenyl hydrocarbyl esters which are preferably the reaction product of a halogen-substituted phenol with a substituted or unsubstituted hydrocarbyl acid, acid chloride or acid anhydride. For ease of convenience herein, these halophenyl hydrocarbyl esters will be referred to simply as halophenyl esters. As will be described more fully below, these halophenyl esters serve as both a flame retardant and a processing aid for the PPO resins and PPO resin blends.

As used herein, the term "hydrocarbyl" is intended to mean a hydrocarbon radical which is preferably an alkyl or aryl group, with the aryl group preferably being phenyl. However, the hydrocarbyl group may also be selected from alkaryl, aralkyl, alkenyl, alkynyl, cycloalkyl or cycloalkenyl. The hydrocarbyl may be substituted with additional halogen atoms or other groups such as hydroxyl, ester, oxyalkyl or oxyaryl groups, such as are exemplified below.

The halogen substituents on the halophenyl esters useful in the present invention are preferably selected from chlorine and bromine, with bromine being particularly preferred. Moreover, it is desirable that the halogen substituents comprise a large percentage of the ester, preferably at least about 25 weight percent of the ester, and more preferably at least about 35 weight percent of the ester. In the case of the preferred bromine-substituted halophenyl esters described below, the bromine may comprise in excess of 50 or 60 weight percent of the ester. The high weight percent of halogen is important since the halogen is believed to be largely responsible for the flame retarding properties.

Preferred halophenyl esters useful as flame retardants and/or processing aids in the compositions of the present invention include esters of the following formula:

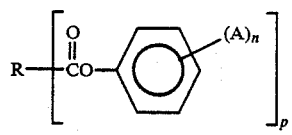

wherein:

(a) R is a substituted or unsubstituted hydrocarbon radical of 1-30 carbons or a substituted or unsubstituted aryl radical of 6-30 carbons, in which said substituents are selected from aryl, substituted aryl, Cl, Br, OH,

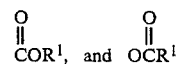

in which $R^1$ is a 1-22 carbon alkyl or aryl which may be optionally substituted by Cl or Br;

(b) A is Br or Cl;

(c) n is an integer of 3 to 5; and (d) p is an integer of 1 to 4.

The hydrocarbon radical may be linear, branched or cyclic, and includes aryl. Particularly preferred halophenyl esters useful in the present invention are those of the above formula in which R is alkyl or substituted alkyl of 1 to 18 carbons or alkylene or substituted alkylene of 1 to 12 carbons; A is Br; n=5; and p is 1 or 2.

The halophenyl esters useful in the invention may be made by known methods, such as those described in the patents referred to above under "Background of the Invention" and as exemplified in specific Examples 1-12 below. A particularly preferred method of making the halophenyl esters comprises reacting a halogenated phenol with the acid chloride of the hydrocarbyl moiety. A tertiary amine, such as triethylamine may advantageously be used to remove the hydrogen chloride by-product of the esterification reaction by precipitation of the triethylamine hydrochloride. The reaction is advantageously carried out in the presence of an organic solvent such as toluene.

Representative halophenyl ester compounds useful in the compositions and methods of this invention are as follows (where A is Br or Cl):

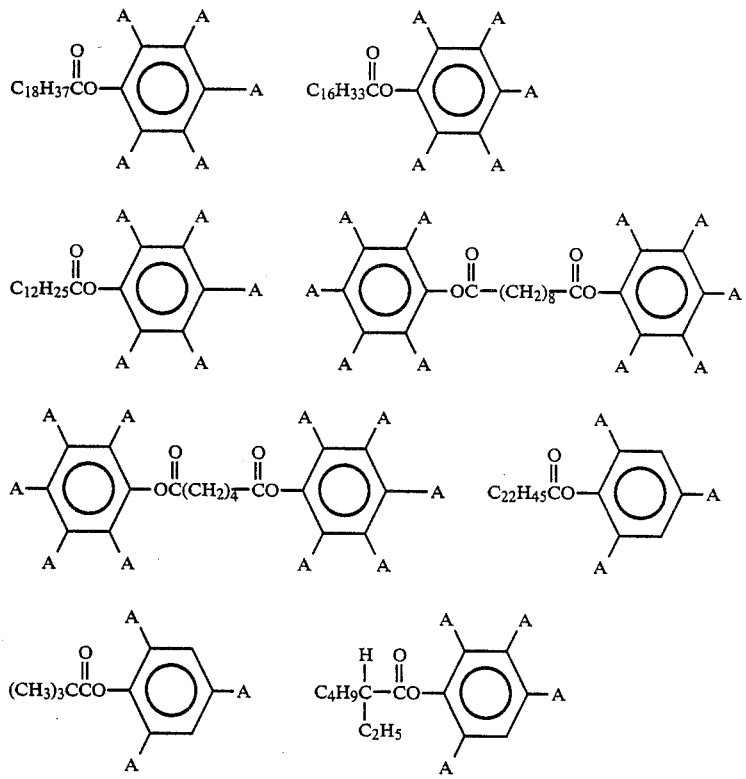

-continued
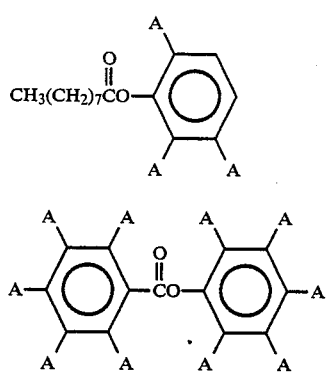
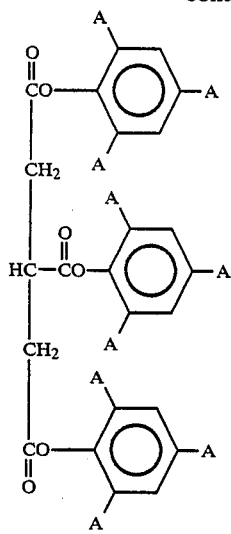
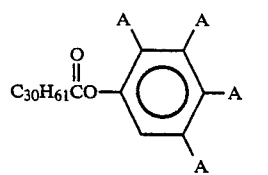
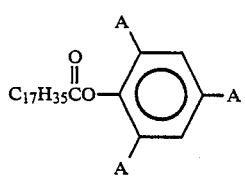
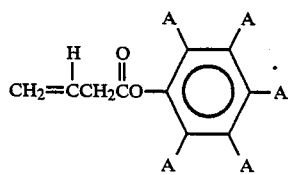
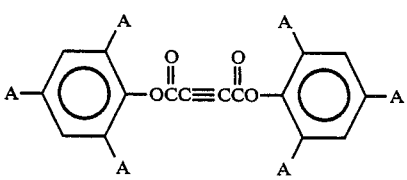
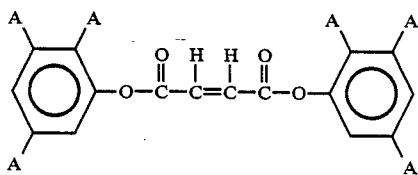
(cis and trans)
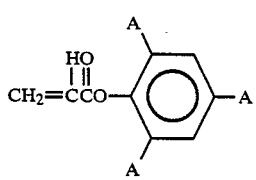
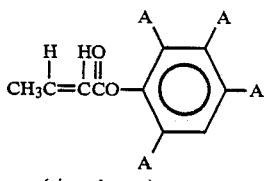
(cis and trans)
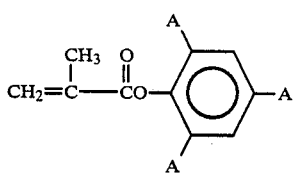
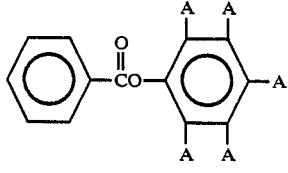
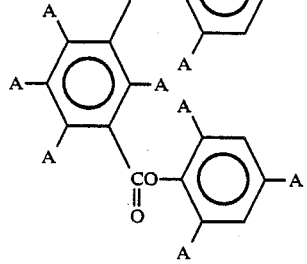

-continued

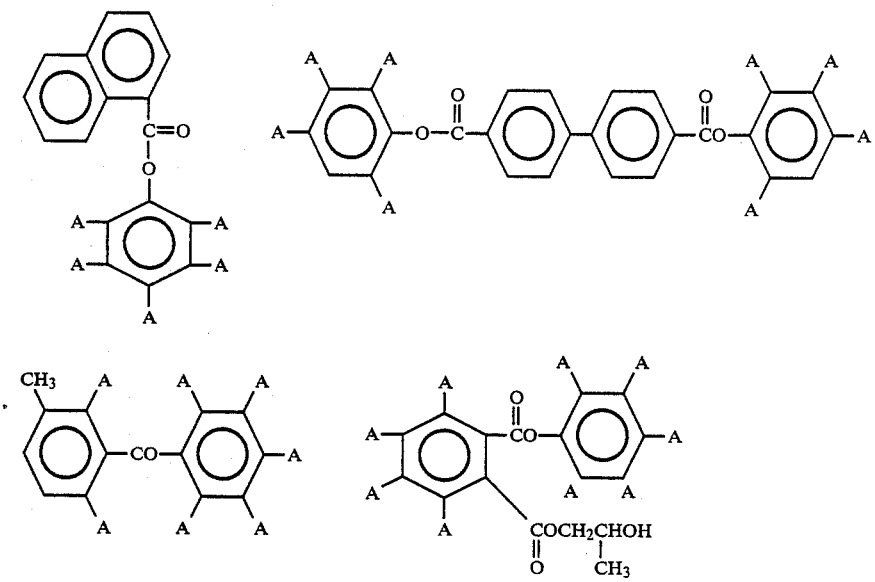

In practicing this invention, the halophenyl ester is added to the polyphenylene ether resin in any convenient manner, such as blending or extruding in order to produce a uniform composition. Flame retardant synergists such as antimony oxide ($Sb_2O_3$) may also be added if desired. In addition, other additives such as thermal stabilizers, ultraviolet stabilizers, reinforcing agents, organic polymers, mold release agents, blowing agents, colorants, and the like may also be optionally included. A further advantage of the halophenyl esters as used in this invention is their improved compatibility with, for example, NORYL resins (blends of polystyrene and polyphenylene ethers containing 25 to 75% of the former).

The halophenyl ester is added to the PPO resin or PPO resin blend in an amount effective to increase the flame retardancy of the composition. Generally, ratios of halophenyl ester to resin in the range of about 1:100 to about 1:2, and preferably about 1:4 to 1:20, will be effective depending upon the particular application. A particular advantage of the present invention is that the higher molecular weight and lower volatility of the halophenyl esters, compared to other halogenated flame retardants, result in less evaporation and loss of the halogenated flame retardant during resin processing, but without reducing the high halogen content which is important to the effectiveness of the flame retarding agent.

In addition to providing increased flame retardancy to the PPO resins and PPO resin blends, the halophenyl esters useful in the present invention are advantageous as processing aids to improve the flowability or moldability of the resin during melt processing, such as extrusion or injection molding.

The invention will now be illustrated in more detail with reference to the following specific, non-limiting examples.

EXAMPLE 1

To a stirred solution of 68.72g (0.25 mole) palmitoyl chloride in 300 ml of toluene was added 122.16g (0.25 mole) of pentabromophenol. Triethylamine (27.82g, 0.275 mole) was added dropwise in 20 minutes, and the temperature rose to 60° C. during this period. Additional toluene (150 ml) was added, and the mixture was refluxed for 1 ½ hours and then cooled overnight. The mixture was filtered and 125.4 g of solids were collected, which was considerably more than the expected triethylamine hydrochloride. These solids were treated with 500 ml of boiling toluene in order to extract out any product and then filtered. The remaining solids weighed 40g which was slightly above theory for the triethylamine salt. The combined filtrate was stripped to give 171.7g of product (94.5% yield). Calcd. %Br, 54.9. Found %Br, 53.9. Analytical data is in agreement with the following assigned structure:

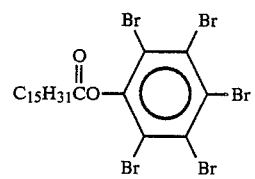

The compound below was prepared according to the procedure outlined in Example 1 except that lauroyl chloride was used in place of palmitoyl chloride. Calcd. %Br, 59.5. und %Br, 56.5. Analytical data is in agreement with the following assigned structure:

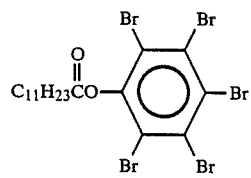

EXAMPLE 1

The compound was prepared according to the procedure outlined in Example 1 except that adipoyl chloride was used in place of palmitoyl chloride. Calcd. %Br, 73.5. Found %Br, 71.5. Analytical data is in agreement with the following assigned structure:

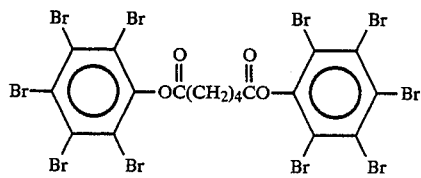

EXAMPLE 4

The compound below was prepared according to the procedure outlined in Example 1 except that stearoyl chloride was used in place of palmitoyl chloride. Calcd. %Br, 52.9. Found %Br, 52.4. Analytical data is consistent with the following assigned structure:

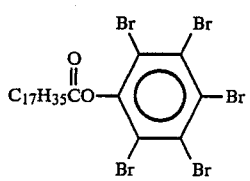

EXAMPLE 5

The compound below was prepared according to the procedure outlined in Example 1 except that sebacoyl chloride was used in place of palmitoyl chloride. Calcd. %Br, 69.6. Found %Br, 65.2. Analytical data is consistent with the following assigned structure:

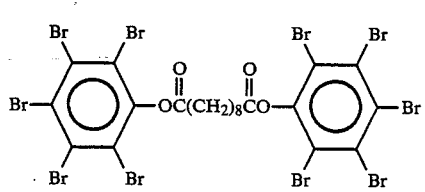

EXAMPLE 6

The compound below was prepared according to the procedure outlined in Example 1 except that benzoyl chloride was used in place of palmitoyl chloride and tribromophenol in place of pentabromophenol.

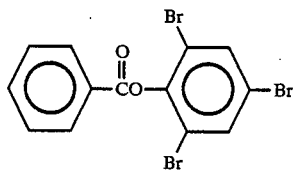

EXAMPLE 7

The compound below was prepared according to the procedure outlined in Example 1 except that isophthaloyl chloride was used in place of palmitoyl chloride and trichlorophenol in place of pentabromophenol.

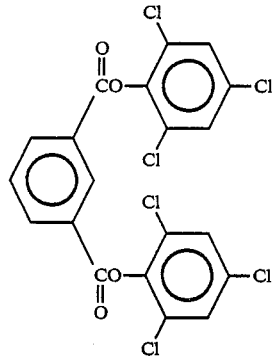

EXAMPLE 8

The compound below was prepared according to the procedure outlined in Example 1 except that α-naphthoyl chloride was used in place of palmitoyl chloride.

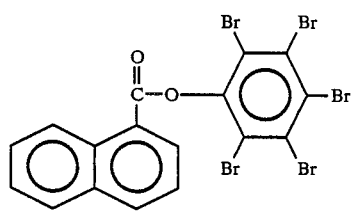

EXAMPLE 9

The compound below was prepared according to the procedure outlined in Example 1 except that m-toluoyl chloride was used in place of palmitoyl chloride.

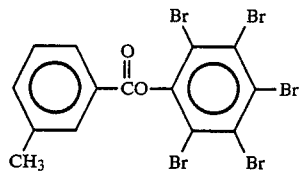

EXAMPLE 10

The compound below was prepared according to the procedure outlined in Example 1 except that pentabromobenzoyl chloride was used in place of palmitoyl chloride.

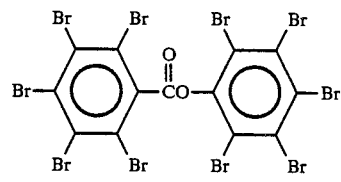

EXAMPLE 11

The compound below was prepared according to the procedure outlined in Example 1 except that tetrachloroisophthaloyl chloride was used in place of palmitoyl chloride and 2,4,6-tribromophenol in place of pentabromophenol.

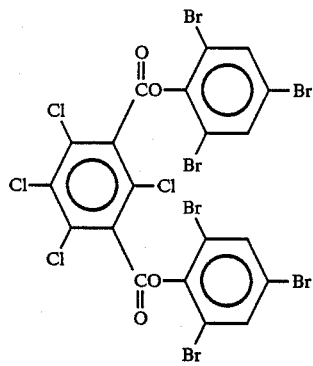

EXAMPLE 12

The compound below was prepared by first reacting pentabromophenol with tetrabromophthalic anhydride to form the pentabromophenyl half-ester of tetrabromophthalic anhydride:

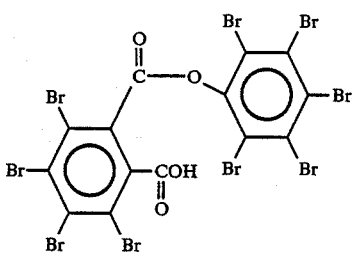

which was then reacted with propylene oxide to yield the following compound:

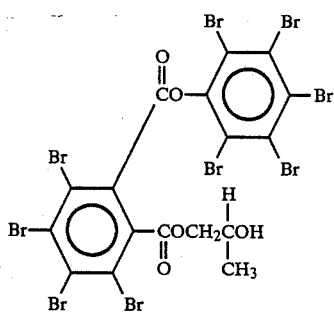

TEST EXAMPLES 13-18

In the following examples, the flame retardancy of the compounds of this invention is demonstrated. The compositions of the invention were prepared by mixing each of the compounds separately of Example 1-5 (12.7 parts), antimony oxide (2.5 parts), and a blend of 50% polyphenylene ether and 50% high impact polystyrene (84.8 parts) in a high speed mixer until the components were blended thoroughly. The compositions were then pressed into plaques which were cut up into strips measuring 4 ½" long × ¼" wide × ⅛" thick on which Limited Oxygen Index (LOI) values were obtained according to the ASTM D2863-77 procedure. In Table I the LOI values are compared to a control consisting only of the polyphenylene ether - polystyrene blend.

TABLE I

| Composition Example No. | Test Compound Example No. | ASTM D2863-77 Flammability (LOI) |
|---|---|---|
| 13 (control) | | 23.8 |
| 14 | 1 | 32.5 |
| 15 | 2 | 32.1 |
| 16 | 3 | 32.5 |
| 17 | 4 | 32.9 |
| 18 | 5 | 31.3 |

The above results demonstrate the increased flame retardancy of the compositions of this invention relative to the control, as indicated by the 25-30% higher LOI values. LOI is a measure of the percentage of oxygen needed in the atmosphere to support burning of the material.

TEST EXAMPLES 9-24

In the following examples, compositions of this invention were prepared as described for Test Examples 13-18 except that the plaques were cut into strips measuring 4 ½" long × ½" wide × ⅛" thick on which the Underwriters' Laboratory Bulletin No. 94 (UL94) vertical test procedures were run. In Table II, the test results are compared to those of the control consisting of a blend of 50% polyphenylene ether and 50% high impact polystyrene.

TABLE II

| Composition Example No. | Test Compound Example No. | UL94 Total Burn Time (sec.) | UL94 Classification |
|---|---|---|---|
| 19 (control) | | 159 | V-2 |
| 20 | 1 | 7 | V-0 |
| 21 | 2 | 1 | V-0 |
| 22 | 3 | 0 | V-0 |
| 23 | 4 | 3 | V-0 |
| 24 | 5 | 7 | V-0 |

The above results demonstrate the increased flame retardancy of the compositions of this invention relative to the control, as indicated by the significantly shorter burn times (after flame removed) and the lower UL classifications.

The present invention may be embodied in other specific forms without departing from the spirit or essential attributes thereof and, accordingly, reference should be made to the appended claims, rather than the specification, as indicating the scope of the invention.

I claim:

1. A flame retardant composition comprising a polyphenylene ether resin and an amount of an ester effective to increase the flame retardancy of said resin, said ester having the formula:

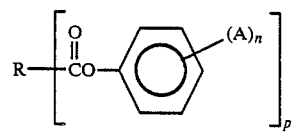

wherein:
(a) R is a substituted or unsubstituted hydrocarbon radical of 1-30 carbons, in which said substituents are selected from aryl or substituted aryl, Cl, Br, OH,

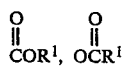

in which $R^1$ is a 1–22 carbon alkyl or aryl which may optionally be substituted by Cl or Br;

(b) A is Br or Cl;

(c) n is an integer of 3 to 5; and (d) p is an integer of 1 to 4.

2. A composition according to claim 1 wherein said halogen is chlorine or bromine and said halophenyl hydrocarbyl ester contains at least about 25 weight percent of bound halogen.

3. A composition according to claim 1 wherein said halogen is bromine and the halophenyl hydrocarbyl ester contains at least about 35 weight percent bound bromine.

4. A composition according to claim 1 wherein said polyphenylene ether resin is selected from the group consisting of polyphenylene ether homopolymers, polyphenylene ether copolymers, and blends of polyphenylene ether with a vinyl aromatic resin.

5. A composition according to claim 1 wherein said polyphenylene ether resin is selected from the group consisting of:

(a) homopolymers having repeated structural units of the formula:

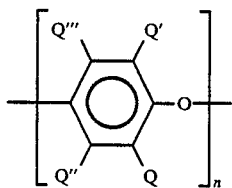

wherein $Q$, $Q'$, $Q''$, and $Q'''$ are independently halogen, hydrocarbon radicals, or halohydrocarbon radicals having at least two carbon atoms between the halogen atom and phenyl nucleus, or $Q'$, $Q''$, and $Q'''$ may be halogen, with the proviso that Q and $Q'$ are free of tertiary carbon atoms, and n represents the total number of monomer units and is an integer of at least 10;

(b) copolymers having repeating structural units of the formula:

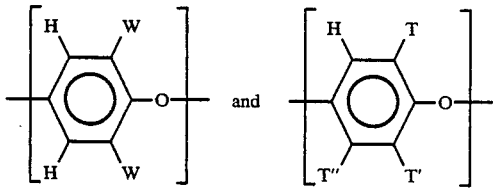

wherein W is independently methyl, Cl, Br, or I; and T, T' and T'' are independently alkyl of 1 to 3 carbons, aryl, alkaryl, haloaryl, or arylalkyl of 6 to 12 carbons; or (c) blends of (a) and/or (b) with (d) vinyl aromatic resins wherein at least 10% by weight of the blend is derived from a vinyl aromatic monomer of a compound having the formula:

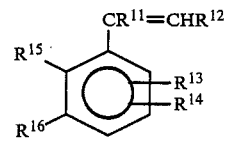

wherein $R^{11}$ and $R^{12}$ are independently lower alkyl or alkenyl groups of from 1 to 6 carbon atoms or hydrogen; $R^{13}$ and $R^{14}$ are independently chloro, bromo, hydrogen, or lower alkyl of from 1 to 6 atoms; $R^{15}$ and $R^{16}$ are independently hydrogen or lower alkyl or alkenyl groups of 1 to 6 carbon atoms, or $R^{15}$ and $R^{16}$ may be concatenated together with hydrocarbyl groups to form a naphthyl group; or (e) copolymers of said vinyl aromatic monomer with moieties having the general formula:

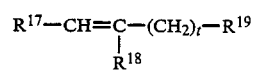

wherein $R^{17}$ and $R^{18}$ are independently hydrogen, halogen, alkyl of 1 to 4 carbon atoms, or carboalkoxy, or $R^{17}$ and $R^{18}$ taken together represent an anhydride linkage of the structure -COOOC-; and $R^{19}$ is hydrogen, vinyl, alkyl or alkenyl having 1 to 12 carbon atoms, cycloalkyl, carboalkoxy, alkoxyalkyl, alkyl-carboxy, ketoxy, halogen, carboxy, cyano or pyridyl; and t is a whole number in the range of about 0 to 9.

6. A composition according to claim 1, wherein the weight ratio of said resin to said ester is in the range of about 100:1 to about 2:1.

7. A composition according to claim 1 wherein the weight ratio of resin to ester is in the range of about 20:1 to 4:1.

8. A composition according to claim 1 wherein said polyphenylene ether resin is a blend of polyphenylene ether homopolymer and a vinyl aromatic resin wherein at least 10% by weight of the blend is the vinyl aromatic resin.

9. A composition according to claim 1 wherein said polyphenylene ether resin is selected from the group consisting of blends of polyphenylene ether homopolymer with polystyrene and blends of polyphenylene ether homopolymer with a copolymer of styrene and 1,3-butadiene.

10. A composition according to claim 1 wherein said polyphenylene ether resin is a homopolymer.

11. A composition according to claim 1 wherein in said ester R is alkyl or substituted alkyl of 1 to 18 carbons or alkylene or substituted alkylene of 1 to 12 carbons; and A is Br.

12. A composition according to claim 11 wherein in said ester n=5 and p is 1 or 2.

13. A method for increasing the flame retardancy of a polyphenylene ether resin, comprising blending with said resin a flame retarding amount of an ester of the formula:

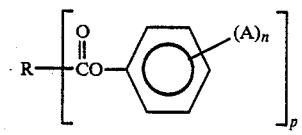

wherein:
(a) R is a substituted or unsubstituted hydrocarbon radical of 1-30 carbons, in which said substituents are selected from aryl or substituted aryl, Cl, Br, OH

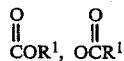

in which $R^1$ is a 1-22 carbon alkyl or aryl which may optionally be substituted by Cl or Br;
(b) A is Br or Cl;
(c) n is an integer of 3 to 5; and
(d) p is an integer of 1 to 4.

14. A method for improving the flow characteristics and moldability of a polyphenylene ether resin during melt processing, comprising blending with said resin an effective amount of an ester of the formula:

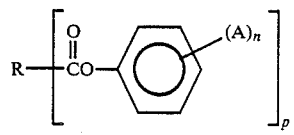

wherein:
(a) R is a substituted or unsubstituted hydrocarbon radical of 1-30 carbons, in which said substituents are selected from aryl or substituted aryl, Cl, Br, OH,

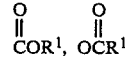

in which $R^1$ is a 1-22 carbon alkyl or aryl which may optionally be substituted by Cl or Br;
(b) A is Br or Cl;
(c) n is an integer of 3 to 5; and
(d) p is an integer of 1 to 4;

* * * * *